United States Patent
Di Giovanni et al.

(10) Patent No.: US 11,499,623 B2
(45) Date of Patent: Nov. 15, 2022

(54) INSTALLATION FOR MOUNTING AN OUTER SUN GEAR

(71) Applicant: SAFRAN TRANSMISSION SYSTEMS, Colombes (FR)

(72) Inventors: Jean-Charles Michel Pierre Di Giovanni, Moissy-Cramayel (FR); Florian Rappaport, Moissy-Cramayel (FR)

(73) Assignee: SAFRAN TRANSMISSION SYSTEMS, Colombes (FR)

(*) Notice: Subject to any disclaimer, the term of this patent is extended or adjusted under 35 U.S.C. 154(b) by 0 days.

(21) Appl. No.: 16/972,694

(22) PCT Filed: Jun. 5, 2019

(86) PCT No.: PCT/FR2019/051346
§ 371 (c)(1),
(2) Date: Dec. 7, 2020

(87) PCT Pub. No.: WO2019/234357
PCT Pub. Date: Dec. 12, 2019

(65) Prior Publication Data
US 2021/0254702 A1  Aug. 19, 2021

(30) Foreign Application Priority Data
Jun. 5, 2018 (FR) ...................................... 1854873

(51) Int. Cl.
*F16H 57/00* (2012.01)
*F16H 57/023* (2012.01)

(52) U.S. Cl.
CPC ... *F16H 57/023* (2013.01); *F16H 2057/0062* (2013.01)

(58) Field of Classification Search
CPC .......... F16H 57/023; F16H 2057/0062; F16H 57/082; F16H 1/28; F16H 1/2854
See application file for complete search history.

(56) References Cited

U.S. PATENT DOCUMENTS

2018/0163850 A1    6/2018  Lao et al.
2020/0263612 A1*   8/2020  Simon ................. F16H 57/0482
(Continued)

FOREIGN PATENT DOCUMENTS

DE    4304657 A1    11/1993
EP    2182244 A1     5/2010
FR    3035375 A1    10/2016

OTHER PUBLICATIONS

International Search Report dated Jul. 30, 2019, issued in corresponding International Application No. PCT/FR2019/051346, filed Jun. 5, 2019, 2 pages.
(Continued)

*Primary Examiner* — Rick K Chang
(74) *Attorney, Agent, or Firm* — Christensen O'Connor Johnson Kindness PLLC (57) ABSTRACT

An installation for mounting an outer sun gear in a reduction gear. The reduction gear includes an outer sun gear and planet gears meshing with an inner sun gear and with the outer sun gear and each mounted for free rotation around a pivot of a planet carrier. The outer sun gear includes a first crown having a first toothing and a second crown having a second toothing each meshing with first and second toothings of the planet gears. The installation includes a frame for supporting the reduction gear along its longitudinal axis, and first and second torque applicators, such as cylinders, that apply a torque around an axis of first and second rings, respectively. The first ring is configured to engage with the first crown of the outer sun gear and the second ring is
(Continued)

configured to engage with a second crown of the outer sun gear.

10 Claims, 4 Drawing Sheets

(56) References Cited

U.S. PATENT DOCUMENTS

2020/0366181 A1* 11/2020 Vanheerden .............. F16H 1/28
2021/0396184 A1* 12/2021 Beck ..................... F16H 55/08

OTHER PUBLICATIONS

Written Opinion of the International Searching Authority dated Jul. 30, 2019, issued in corresponding International Application No. PCT/FR2019/051346, filed Jun. 5, 2019, 6 pages.
Written Opinion of the International Searching Authoritydated Jul. 30, 2019, issued in corresponding International Application No. PCT/FR2019/051346, filed Jun. 5, 2019, 7 pages.
International Preliminary Report on Patentability dated Dec. 8, 2020, issued in corresponding International Application No. PCT/FR2019/051346, filed Jun. 5, 2019, 1 page.

* cited by examiner

INSTALLATION FOR MOUNTING AN OUTER SUN GEAR

FIELD OF THE INVENTION

This disclosure concerns a process for mounting an external sun gear in a gearbox and an installation for carrying out the process.

BACKGROUND OF THE INVENTION

Typically, a power transmission reduction gear in a turbomachine comprises planet gears meshing with an outer sun gear and a central or inner sun gear. The planet pinions are carried by a planet carrier and mounted freely rotatably on axes. Such a reduction gear can be used in particular for the power transmission from a drive shaft such as the shaft of a low-pressure compressor, to a blower wheel via a central pinion supported by the shaft.

There are several reduction gear architectures. In the state of the art of double-flow turbomachines, the reduction gears are of the planetary or epicyclic type. In other similar applications, there are so-called differential or compound architectures:

On a planetary reduction gear, the planet carrier is fixed and the outer sun gear is the output shaft of the device, which rotates in the opposite direction to the inner sun gear.

In an epicyclic reduction gear, the outer sun gear is fixed and the planet carrier is the output shaft of the device which rotates in the same direction as the inner sun gear.

On a differential reduction gear, no element is fixed in rotation. The outer sun rotates in the opposite direction to the inner sun and the planet carrier.

In a particular arrangement of a reduction gear, the outer sun gear comprises a first downstream crown and a second upstream crown meshed with first downstream toothing of the planet gears and second upstream toothing of the planet gears, respectively. The use of an outer sun gear consisting of a first and a second crown is necessary when the toothing of the first crown, the toothing of the second crown and the first and second toothing of the planet gears are inclined with respect to the longitudinal axis of the reduction gear, i.e. the axis of rotation of the turbomachine. In this configuration, the inner sun gear also has two toothings. The same necessity is even more obvious when the toothings have a herringbone configuration. Remember that a herringbone toothing has the advantage of reducing the noise level and increasing the number of contacts between the planet gears and the inner and outer sun gears. Thus, when the outer sun gear comprises a first crown and a second crown, the first crown is engaged axially on the first toothings of the planet gears in a first direction and the second crown is engaged axially on the second toothings of the planet gears in a second direction opposite to the first direction.

In order to allow optimum engagement with the planet gears, the first and second crowns must be precisely positioned and oriented in relation to each other, i.e. have their respective toothings concentric and be precisely angularly oriented in relation to each other. If they are badly positioned and/or badly oriented, this leads to a higher load asymmetry in operation on one of the crowns compared to the other crown, which can therefore weaken it as well as the associated toothings of the planet gears. This can also lead to premature wear of the toothings of the crown and the planet gears, degrade efficiency, increase noise generation and increase vibration.

A special difficulty arises specifically with regard to herringbone toothings. Indeed, each tooth of the first toothing of the inner or outer sun gear or planet gears comprises two flanks and a straight line extending along one of the flanks intercepts a straight line extending along a flank of the second toothing at a given axial position. To ensure correct operation of the reduction gear, the various axial positions mentioned above must all lie in a same radial plane. However, the axial positions of the intercepts depend on machining defects. To compensate for these machining defects, the following solutions for centring the first and second crowns are used.

In the known technique, crowns are manufactured separately, assembled, and then ground once assembled. They are then paired and considered as a set. The alignment of the first and second crowns is achieved in several ways. Thus, according to a first possibility, an annular centring of the first and second crowns around the axis of the reduction gear is carried out and a pin is used to carry out the angular orientation of the first and second crowns. A second possibility is to use two pins shrunk into one of the crowns and engaged in two fitted holes in the other of the crowns. In a third possibility, three pins distributed at 120° to each other around the axis of the reduction gear are used, shrunk into one of the crowns and mounted in three fitted oblong holes in the other of the crowns. Finally, in a fourth possibility, screws are used to fix the first and second crowns as centring screws, thus allowing combined positioning and orientation, which replace the pins while ensuring that the first and second crowns are held in position as well as the torque recovery between the first and second crowns.

SUMMARY OF THE INVENTION

This document firstly concerns a method of mounting a longitudinal axis reduction gear comprising an outer sun gear and planet pinions meshing with an inner sun gear and with the outer sun gear and each mounted freely rotatably on a planet carrier, about their axis, for example on pivots, the outer sun gear comprising a first crown comprising a first toothing and a second crown comprising a second toothing each meshing with first and second toothing of the planet pinions, the method comprising the following steps:

a) Providing an assembly comprising the inner sun gear, the planet gears meshing with an inner sun gear and carried by a planet carrier, b) Mounting the first crown and the second crown around the planet gears so that the toothings of the first crown and the second crown mesh with the first toothings of the planet gears and the second toothings of the planet gears, c) Applying a first torque to the first crown centred on the axis of the first crown and a second torque to the second crown centred on the axis of the second crown, the first torque and the second torque having identical values and being applied in the same direction of rotation about the axes of the first and second crowns.

Each of the first crown and the second crown is properly centred on the respective toothings of the planet gears. Thus, the first crown is centred on the first toothings of the planet gears and the second crown is centred on the second toothings of the planet gears. The centring of the first crown in relation to the second crown is no longer necessary to ensure the proper functioning of the reduction gear. The process ensures a better distribution of contacts between the toothings of the planet gears and the toothings of the crowns, i.e. between the first toothing of the planet gears and the toothing of the first crown on the one hand and between the second toothings of the planet gears and the toothing of the second crown on the other hand.

It is thus possible to apply a torque corresponding to the torque experienced by the gearbox during a given operating phase. In this way, a bending force is induced on the toothings in contact so that the reduction gear is already in a configuration adapted to the desired phase of use when this phase is reached so that the two crowns are positioned and oriented (or paired) according to the bending that the toothings of the planet gears would undergo during this phase of flight.

The proposed technical solution allows the positioning and orientation of the first and second crowns to be ensured between them, resulting in crowns that are easier to machine as they do not require assembled grinding, which is therefore more economical. Without assembled grinding, the first and second crowns are not paired, so the first and second crowns are interchangeable with other first and second crowns, which results in less scrap, facilitates assembly and contributes to increasing the service life of the reduction gear. In addition, it allows for a simplified repair, by making it possible, in the event of damage to the toothings of one of the crowns, to no longer have to change the assembly consisting of the two crowns, but only to change the damaged crown and then to proceed with the assembly again using the method proposed in this document.

According to another characteristic, the process may include after step c) a step of joining the first crown and the second crown. Thus, while the torque is maintained on the crowns, they are fixed together in order to fix the positioning and orientation of the crowns in relation to the planet gears.

The joining step can be carried out by bolting a first annular flange of the first crown to a second annular flange of the second crown.

This technological proposal is very useful in the case where the first and second toothings of the planet gears, the first toothing of the first crown and the second toothing of the second crown are inclined with respect to the longitudinal axis of the reduction gear.

The process may also include an intermediate step between steps a) and b) consisting of locking the inner sun gear, planet gears and planet carrier against rotation about the longitudinal axis X.

This document also concerns an installation for mounting a two-ring outer sun gear in a reduction gear, e.g. with epicyclic or planetary configuration, comprising:

a frame for supporting said reduction gear along said axis,
first means for applying a torque around the axis of a first ring capable of engaging with a first crown of the outer sun gear,
Second means for applying a torque around the axis of a second ring capable of engaging with a second crown of the outer sun gear,
the first ring being connected to the first torque-applying means by first connecting means allowing a degree of freedom of the first ring in a plane perpendicular to the longitudinal axis and the second ring being connected to the second torque-applying means by second connecting means allowing a degree of freedom of the first ring in a plane perpendicular to the longitudinal axis, the first connecting means being independent of the second connecting means.

The installation allows the first ring to be positioned independently of the second ring in a plane radial to the longitudinal axis of the reduction gear, thus allowing each ring to be perfectly positioned on a crown of the reduction gear and consequently the application of torque to both crowns independently.

The installation can be such that:
the first means for applying a torque comprise N traction members carried by the frame, evenly distributed around the axis of said first ring, N being greater than or equal to 2,
the second means for applying a torque comprise K traction members carried by the frame, evenly distributed around the axis of said first ring, K being greater than or equal to 2, The first torque application means may comprise at least one first traction member and at least one second traction member carried by the frame and configured to exert a traction force at two diametrically opposite points of the first ring and in opposite directions, the second torque application means comprising at least one third traction member and at least one fourth traction member carried by the frame and configured to exert a traction force at two diametrically opposite points of the second ring and in opposite directions.

Each traction member can be connected to the ring with which it is associated by a connecting means such as a connecting rod rotatably hinged at one end to the ring in question and rotatably hinged at the opposite end to a movable part of said traction member.

The traction elements can be cylinders, for example.

The first ring and the second ring may still have on their inner faces axial splines capable of cooperating with corresponding axial splines formed on radially outer faces of annular flanges of the first and second crowns.

The installation advantageously includes means for locking the reduction gear against rotation about the longitudinal axis X of the reduction gear, the inner sun gear and the planet carrier. These locking means ensure an initial locking of the above-mentioned elements before torque is applied to the first and second rings. These locking means can be of several types and partly of the splines/narrows type and partly by tightening one or more nuts.

The reduction gear which can be used with the installation can be such that is comprises an outer sun gear and planet gears meshing with an inner sun gear and with the outer sun gear and each mounted freely rotatably on a planet carrier, about their axis, for example on pivots, the outer sun gear comprising a first crown comprising a first toothing and a second crown comprising a second toothing each meshing with first and second toothing of the planet gears.

The invention will be better understood and other details, characteristics and advantages of the invention will appear when reading the following description, which is given as a non-limiting example, with reference to the attached drawings.

DETAILED DESCRIPTION

Figure 1:
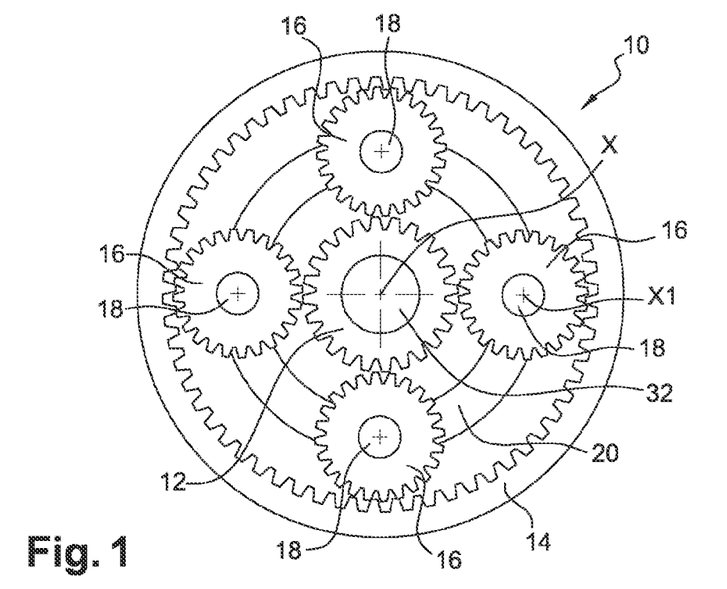
FIG. 1 is a radial sectional diagram of a gearbox.

FIG. 1 schematically illustrates the structure of an epicyclic or planetary reduction gear. This type of reduction gear 10 typically includes an inner sun gear planetary 12 (also called central pinion or solar gear) and an outer sun gear 14, the two sun gears being coaxial. The inner sun gear 12 can be rotated about its X axis, the outer sun gear 14 can be fixed, or rotationally coupled to a propeller as in the case of a turboprop or a blower wheel as in the case of a double flow turbojet. The reduction gear 10 further comprises planet gears or planet pinions 16 mounted to be movable in rotation on pivot pins 18 of a planet carrier 20. Each planet gear 16 meshes with both the inner sun gear 12 and with the outer sun gear 14. The planet carrier 20 is fixed or able to pivot pin about the axis X of the inner sun gear 12 and the outer sun gear 14. The inlet can be formed by the sun gear 12 and the outlet by the planet gear carrier 20.

In another example, the carrier 20 can be fixed or rotatably coupled to a propeller of a turboprop or a blower wheel of a dual-flow turbojet engine.

Figure 2:
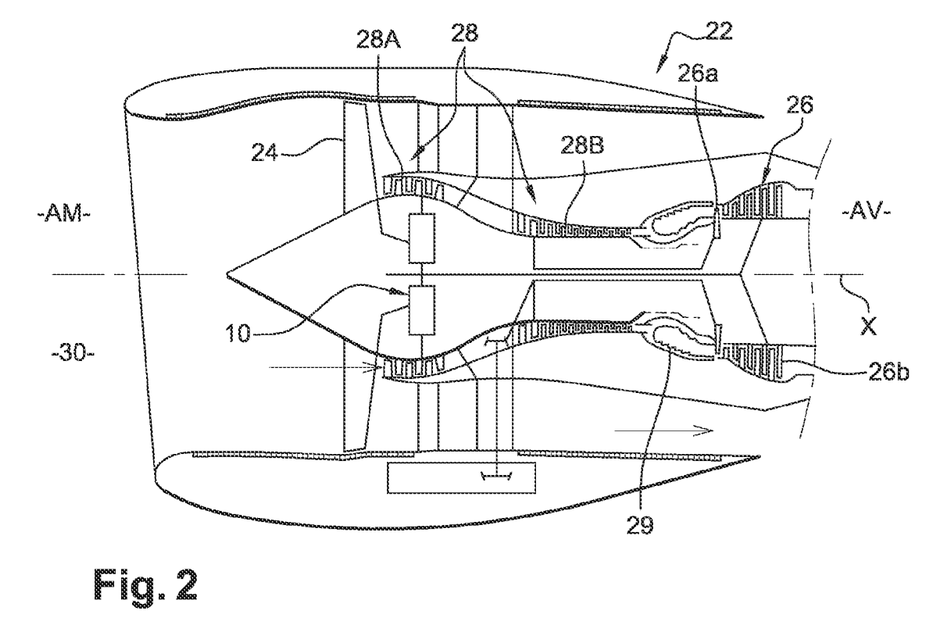
FIG. 2 is a longitudinal diagram of a turbomachine.

FIG. 2 shows schematically a turbomachine 22 comprising from upstream to downstream a blower 24, a low pressure compressor 28a and a high pressure compressor 28b, a combustion chamber 29, a high pressure turbine 26a and a low pressure turbine 26b. The high-pressure turbine rotor drives the high-pressure compressor rotor and the low-pressure turbine rotor drives the low-pressure compressor rotor, which is connected to the blower. A reduction gear 10 is interposed between the blower rotor and the low-pressure compressor rotor to reduce the rotational speed of blower 24, depending on the rotational speed of the low-pressure turbine rotor.

The central pinion, or inner sun gear 12, surrounds and is then fixed in rotation to the shaft 32 of the low-pressure compressor 28, as illustrated for example in FIGS. 1 and 2. In particular, the reduction gear 10 can be mounted in a radially formed annular chamber inside a low-pressure compressor 28a arranged downstream of the blower impeller 24 and upstream of a high-pressure compressor 28b, as shown in FIG. 2.

Figures 3, 4, 5A:
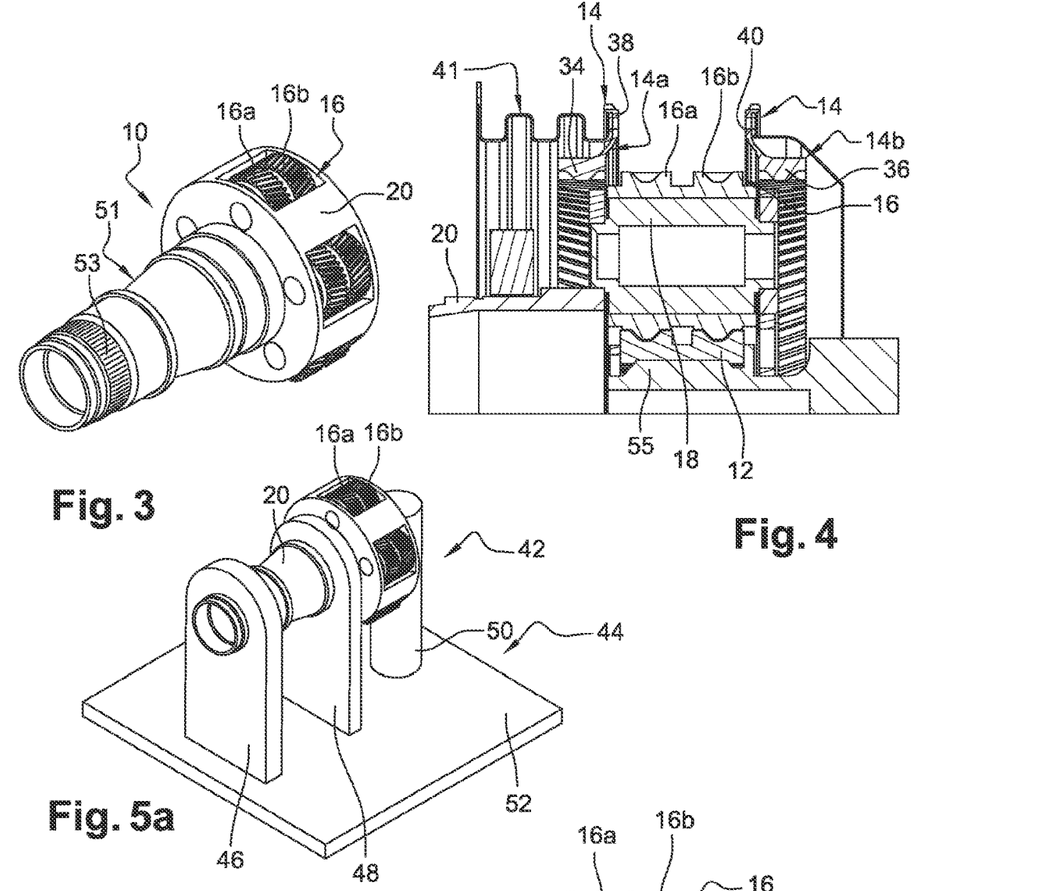
FIG. 3 is a schematic perspective view of an reduction gear of an epicyclic type deprived of an outer sun gear.
FIG. 4 is a schematic sectional view of the outer sun gear comprising two crowns to be joined together and surrounding planet gears with two toothings.
FIGS. 5a and 5b are schematic perspective and cross-sectional views of the reduction gear in FIG. 3 mounted on an outer sun gear mounting facility.

FIG. 3 shows the previously detailed reduction gear 10 in perspective, the outer sun gear not being shown. We can thus distinguish the planet carrier 20 carrying planet gears 16, as well as the toothings of the planet gears 16a and 16b. As can also be seen in FIG. 4, the outer sun gear 14 consists of a first crown 14a and a second crown 14b. The planet gears 16 each comprise a first toothing 16a and a second toothing 16b which are axially spaced along the longitudinal X axis. The first toothing 16a of the planet gears 16 mesh with a first toothing 34 of the first crown 14a of the outer sun gear 14 and the second toothing 16b of the planet gears 16 mesh with a second toothing 36 of the second crown 14b. As can be seen, the first toothing 34 of the first crown 14a and the second toothing 36 of the second crown 14a are inclined in relation to the longitudinal X axis of reduction gear 10. More specifically, the first 34 and second 36 toothing of crowns 14a, 14b are inclined in a herringbone configuration, which increases the contact area between toothings 16a, 16b of planet gears 16 and toothing 34, 36 of crowns 14a, 14b. In order to obtain such a mounting, it is easy to understand that the first crown 14a and the second crown 14b must be mounted along the longitudinal X-axis and in opposite directions. It should also be noted that the first crown 14a comprises a radial annular flange 38 intended to be applied and fixed, by bolting for example, to a second radial annular flange 40 of the second crown 14b. The connection of these two radial annular flanges 38, 40 can also be used to fix one or more other flanges, allowing for example the crown holder 41 to be fixed together with the said radial annular flanges 38, 40.

As indicated above, the first crown 14a and the second crown 14b are mounted, for example, by centring the second crown 14b on the first crown 14a. However, this assembly leads to an overloading of one of the first 16a and second 16b toothings of the planet gears 16, which is undesirable.

An installation and a procedure is thus proposed for the optimal mounting and alignment of the first crown 14a and the second crown 14b around the toothings 16a and 16b of planet gears 16.

FIGS. 5a, 5b, 6a and 6b represent an installation 42 according to this document, the installation comprising a frame 44 forming means for supporting the reduction gear and comprising a first support member 46, a second support member 48 and a third support member 50 carried by a base 52 of the frame 44. The first unit 46 and the second unit 48 are used to hold the planet carrier in position. For example, in the case of a planet carrier with an epicyclic configuration, these units 46, 48, 50 comprise a tubular body 51 extending along the longitudinal axis X of the reduction gear. The first unit 46 and the second unit 48 each comprise an opening for receiving the tubular body 51 connected to the planet carrier. The third support unit 50 comprises an arm 55 extending along the longitudinal axis X of reduction gear 10 when supported by frame 44. The first support unit 46 has an opening whose inner periphery includes means for preventing rotation such as axial splines for example, cooperating with splines 53 of the tubular body 51. The arm 55 has a fastening device with the inner sun gear 12, e.g. via splines 54 cooperating with splines on the radially inner side of the inner sun gear 12. Thus, the inner sun gear 12, the planet gears and the planet carrier are locked in rotation around the X axis on arm 55. The splines on the radially inner face of inner sun gear 12 are pre-existing and allow the inner sun gear 12 to be coupled in rotation with shaft 32 of the compressor. A nut can be screwed onto the free end of arm 55 and tightened via the end of the planet carrier.

Figure 6A:
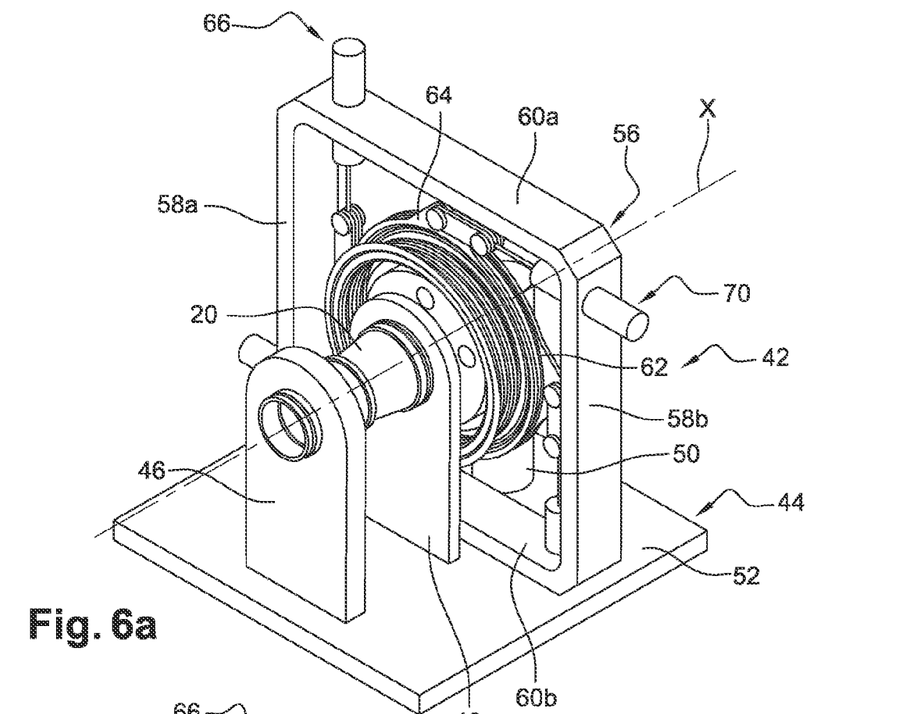
FIGS. 6a and 6b are schematic perspective and front views of the installation in FIGS. 5a and 5b also showing a gantry supporting application means intended to allow the application of a torque to the outer planetary gear.
Figure 6B:
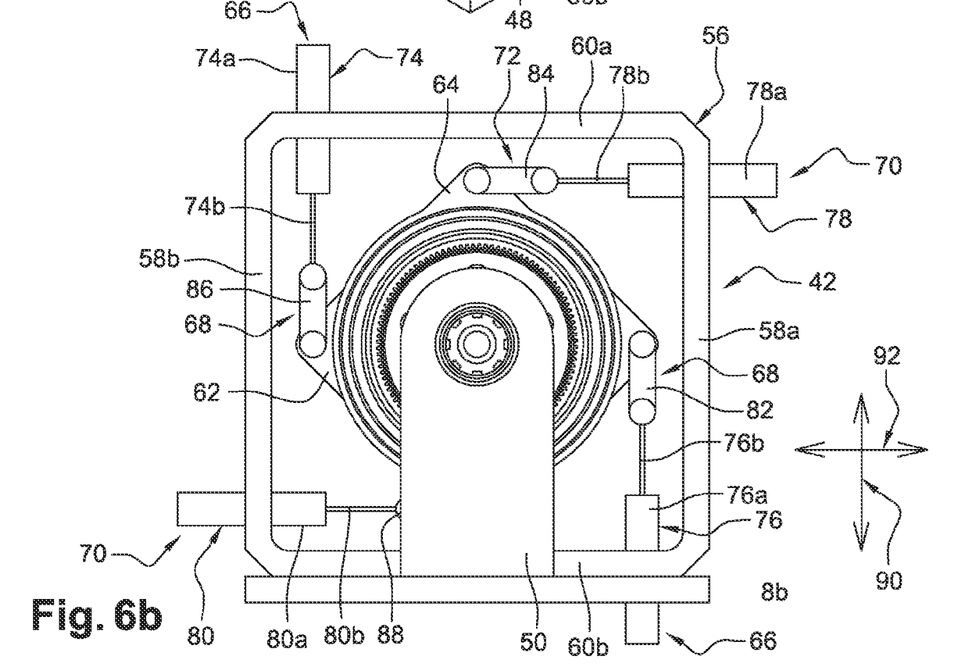
Figure 7:
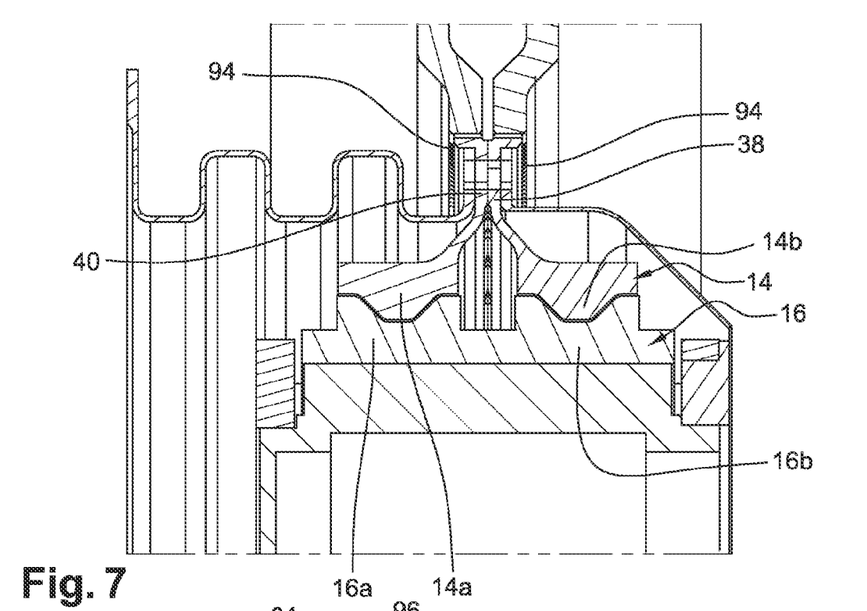
FIGS. 7 and 8 are schematic sectional views illustrating the assembly steps of the outer planetary gear of the reduction gear.
Figure 8:
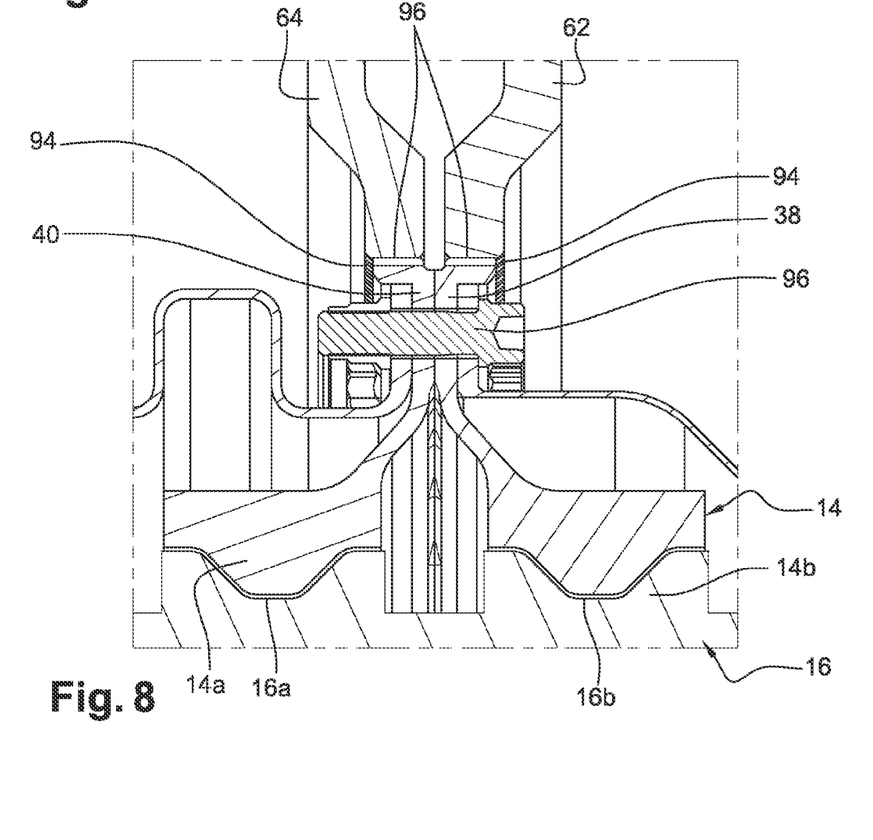

Frame 44 also includes a gantry 56, shown only in FIGS. 6a and 6b and carried by base 52. This gantry 56 has a substantially rectangular shape formed by two first vertical uprights 58a, 58b and two second horizontal uprights 60a, 60b. In one particular embodiment, the horizontal upright 60b could be confused with the base 52.

The gantry 56 carries a first ring 62 and a second ring 64 axially spaced from each other and each having an axis substantially aligned with the longitudinal X-axis of the gearbox without being purely coaxial therewith. The first ring 62 is connected to first means for applying a torque 66 to the first ring 62 carried by the gantry 56 via first connecting means 68 allowing a degree of freedom of the first ring 62 in rotation about the longitudinal X axis. Similarly, the second ring 64 is connected to the gantry 56 to second torque application means 70 to the second ring 64 via second connecting means 72 allowing a degree of freedom of the second ring 64 in rotation around the longitudinal X axis. As can be seen, the first connecting means 68 and the second connecting means 72 are independent of each other, thus allowing the first ring 62 and the second ring 64 to be linked independently to the portal 56.

The first means of applying torque 66 comprises a first traction member 74 and a second traction member 76 carried by the gantry 56 of frame 44. The first traction member 74 is carried by a horizontal upright 60*a* of gantry 56 and the second traction member 76 is carried by the horizontal upright 60*b* opposite gantry 56. The second means of applying torque 70 comprises a third traction member 78 and a fourth traction member 80 carried by the gantry 56 of frame 44. The third traction member 78 is carried by a vertical upright 58*a* of gantry 56 and the fourth traction member 80 is carried by the vertical upright 58*b* opposite gantry 56. In a particular configuration, the traction members 74, 76, 78, 80 are cylinders each comprising a cylinder body 74*a*, 76*a*, 78*a*, 80*a* and a rod 74*b*, 76*b*, 78*b*, 80*b* translationally mounted in the cylinder body 74*a*, 76*a*, 78*a*, 80*a*.

A connecting rod 82, 84, 86, 88 connects one end of each cylinder rod 74*a*, 76*a*, 78*a*, 80*a* to the periphery of a ring 62, 64. In particular, the first traction member 74 is connected by a first connecting rod 86 to the first ring 62 and the second traction member 76 is connected by a second connecting rod 82 to the first ring 62. The third traction member 78 is connected by a third connecting rod 80 to the second ring 64 and the fourth traction member 80 is connected by a fourth connecting rod 88 to the second ring 64.

As shown in FIGS. 6*a* and 6*b*, each connecting rod 82, 84, 86, 88 is rotatably hinged at one end to a ring 62, 64 and at its opposite end to the cylinder rod 74*b*, 76*b*, 78*b*, 80*b*. In particular, it is observed that the first link 82 and the second link 86, which are connected to the first ring 62, are oriented substantially parallel and extend in opposite directions from a first direction 90 substantially perpendicular to the longitudinal X axis and from opposite ends of a diameter of the first ring 62. Also, the third link 84 and the fourth link 88, which are connected to the second ring 64, are oriented substantially parallel and extend in opposite directions from a second direction 92 substantially perpendicular to the longitudinal X axis and from opposite ends of a diameter of the second ring 64. Note that the first direction 90 is perpendicular to the second direction 92, which in particular saves space for mounting the torque application means on the gantry.

The first ring 62 comprises first means of coupling in rotation with the first crown 14*a*, these first means of coupling cooperating with complementary means carried by the first crown. Also, the second ring 64 comprises second means of coupling in rotation with the second crown 14*b*, these second means of coupling cooperating with complementary means carried by the second crown 14*b*. In a practical embodiment, the first coupling means of the first ring 62 and the second coupling means of the second ring 64 are splines 94 which cooperate with splines 96 of the radially outer surfaces of the first crown 14*a* and the second crown 14*b*.

To mount the first crown 14*a* and the second crown 14*b* in reduction gear 10, the installation as described above is used. It is understood that another installation could be used, however.

Figure 5B:
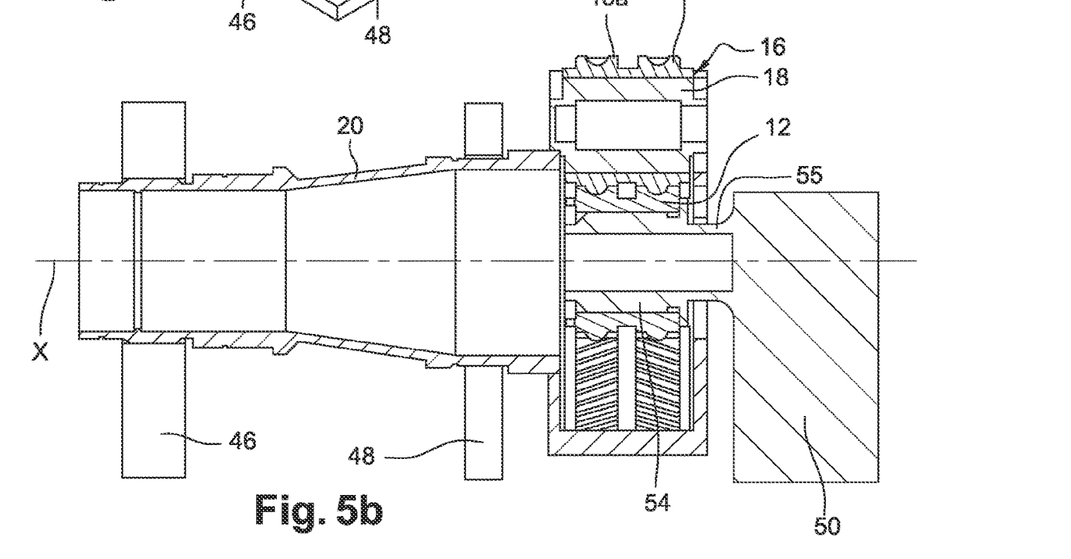

Thus, in a first step, the assembly consisting of the inner sun gear 12, the planet gears 16 and the planet carrier 20 is mounted on frame 44 in the indicated position as shown and described in FIGS. 5*a* and 5*b*. In a second step, the first crown 14*a* is mounted around the planet gears 16 so that the first toothing 34 of the first crown 14*a* meshes with the first toothing 16*a* of the planet gears 16. Also, in this second step, the second crown 14*b* is mounted around the planet gears 16 so that the second toothing 36 of the second crown 14*b* meshes with the second toothing 16*b* of the planet gears 16. In a third step, the first ring 62 is mounted in engagement with the radially outer periphery of the first flange 38 and the second ring 64 is mounted in engagement with the radially outer periphery of the second flange 40. In a fourth step, a first torque is simultaneously and independently applied to the first ring 62 centred on the axis of the first ring 14*a* and a second torque is applied to the second ring 14*b* centred on the axis of the second ring 14*b*, the first torque and the second torque having identical values. The first torque and the second torque are applied in the same direction of rotation around the axes of the first and second crowns. The application of the torques independently to each of the first ring 62 and the second ring 64 is made possible by the use of the linkage means as described above. In a fifth step, the first 38 and second 40 flanges are tightened together by bolting 96 into holes in the first and second flanges.

In another embodiment, the engagement of the first ring 62 with flange 38 of the first ring 14*a*, and of the second ring 64 with flange 40 of the second ring 14*b*, can be achieved by systems other than external radial engagements, such as tie rods passing through the screw holes of flanges 38 and 40.

In a process embodiment, the torque applied to a value which corresponds to the torque undergone by the reduction gear during a given phase of use, this torque being, for example, greater than 10 N. It is understood that the torque must be non-zero.

The invention claimed is:

1. An installation for mounting an outer sun gear with a double crown in a reduction gear, the reduction gear having a longitudinal axis and including an outer sun gear and planet gears meshing with an inner sun gear and with the outer sun gear, each planet gear mounted for free rotation on a planet carrier, the outer sun gear comprising a first crown having a first toothing and a second crown having a second toothing, the first and second toothing of the first and second crowns meshing with first and second toothings of the planet gears, respectively, the installation comprising:
   a frame for supporting said reduction gear along the longitudinal axis;
   first means for applying a torque around an axis of a first ring, the first ring configured to engage with the first crown of the outer sun gear;
   second means for applying a torque around an axis of a second ring, the second ring configured to engage with the second crown of the outer sun gear,
   the first ring being connected to the first means for applying a torque by first connecting means allowing a degree of freedom of the first ring in a plane perpendicular to the longitudinal axis, and
   the second ring being connected to the second means for applying a torque by second connecting means allowing a degree of freedom of the second ring in a plane perpendicular to the longitudinal axis, the first connecting means being independent of the second connecting means.

2. The installation according to claim 1, wherein:
   the first means for applying a torque comprise N traction members carried by the frame and evenly distributed around the axis of said first ring, and the second means for applying a torque comprise N traction members carried by the frame and evenly distributed around the axis of said second ring.

3. The installation according to claim 1, wherein the first means for applying a torque comprises at least one first traction member and at least one second traction member, the at least one first traction member and the at least second traction member being carried by the frame and being configured to exert a traction force at two diametrically opposite points of the first ring and in opposite directions, the second means for applying a torque comprising at least one third traction member and at least one fourth traction member, the at least one third traction member and at least one fourth traction member being carried by the frame and being configured to exert a traction force at two diametrically opposite points of the second ring and in opposite directions.

4. The installation according to claim 2, in which wherein each traction member is connected to the ring with which it is associated by one of the respective said first or second connecting means, the first and second connecting means each comprising a connecting rod articulated in rotation at one end to the ring in question and articulated in rotation at the opposite end to a movable part of said traction member.

5. The installation according to claim 2, in which wherein the traction members are cylinders.

6. The installation according to claim 1, wherein the first ring and the second ring comprise on their inner faces axial splines capable of cooperating with corresponding axial splines formed on radially outer faces of annular flanges of the first and second crowns.

7. The installation according to claim 1, wherein the frame comprises means for preventing rotation about the longitudinal axis, the inner sun gear and the planet carrier.

8. The installation according to claim 1, wherein the reduction gear has an epicyclic or planetary configuration.

9. An installation for mounting an outer sun gear with first and second crowns in a reduction gear, the installation comprising:
a frame for supporting said reduction gear along the longitudinal axis;
first and second cylinders arranged to apply a torque to a first ring, the first ring configured to be engageable with the first crown of the outer sun gear;
third and fourth cylinders arranged to apply a torque to a second ring, the second ring configured to engageable with the second crown of the outer sun gear,
the first ring being connected to said first and second cylinders by first and second connecting links, respectively, in a manner that allows a degree of freedom of the first ring in a plane perpendicular to the longitudinal axis, and
the second ring being connected to said third and fourth cylinders by third and fourth connecting links, respectively, in a manner that allows a degree of freedom of the second ring in a plane perpendicular to the longitudinal axis, the first connecting rod being independent of the second connecting rod.

10. The installation according to claim 9, wherein the first and second cylinders are carried by the frame and are configured to exert a force at two diametrically opposite points of the first ring via the first and second connecting links, respectively, and in opposite directions, and wherein the third and fourth cylinders are carried by the frame and are configured to exert a force at two diametrically opposite points of the second ring via the third and fourth connecting links, respectively, and in opposite directions.

* * * * *